United States Patent
Honda et al.

(10) Patent No.: US 10,094,622 B2
(45) Date of Patent: Oct. 9, 2018

(54) METHOD FOR FORMING CRYSTAL NUCLEUS IN LATENT HEAT STORAGE MATERIAL AND HEAT STORAGE DEVICE

(71) Applicant: Panasonic Intellectual Property Management Co., Ltd., Osaka (JP)

(72) Inventors: Renji Honda, Nara (JP); Shigenori Maeda, Kyoto (JP); Toyoji Gushima, Osaka (JP); Hironori Tomita, Nara (JP); Toshiyasu Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 427 days.

(21) Appl. No.: 14/711,789

(22) Filed: May 14, 2015

(65) Prior Publication Data
US 2015/0345874 A1    Dec. 3, 2015

(30) Foreign Application Priority Data

May 29, 2014 (JP) .................................. 2014-110817

(51) Int. Cl.
   *F28D 20/02*    (2006.01)
   *F28D 7/00*     (2006.01)

(52) U.S. Cl.
   CPC ......... *F28D 20/028* (2013.01); *F28D 7/0016* (2013.01); *Y02E 60/145* (2013.01)

(58) Field of Classification Search
   CPC ............ F23L 15/00; F23L 15/02; F28D 17/00; F28D 20/00; F28D 20/02; F28D 20/028;
   (Continued)

(56) References Cited

U.S. PATENT DOCUMENTS 4,258,696 A * 3/1981 Gopal ................... F24D 11/007
                                                          126/400
4,415,465 A * 11/1983 Koike .................... C09K 5/063
                                                          126/400
(Continued)

FOREIGN PATENT DOCUMENTS

JP        60-029592        2/1985
JP        62-172190        7/1987
                (Continued)

OTHER PUBLICATIONS

Machine Translation JP2004003832A.*
JP 2004003832 Machine Translation.*

*Primary Examiner* — Len Tran
*Assistant Examiner* — Gustavo Hincapie Serna
(74) *Attorney, Agent, or Firm* — McDermott Will & Emery LLP (57) ABSTRACT

A method for forming a crystal nucleus in a latent heat storage material contains a solvent and a dissolved substance. The solvent contains water as the main ingredient. The latent heat storage material retains latent heat in a supercooled state. The method includes: (a) separating out an anhydride of the dissolved substance by heating or cooling part of the latent heat storage material in the supercooled state; and (b) supplying a droplet comprising water to the anhydride, to terminate the supercooled state of the latent heat storage material, and make the latent heat storage material dissipate heat.

6 Claims, 7 Drawing Sheets

(58) Field of Classification Search
CPC ... H05B 3/00; F24D 11/00; F24F 5/00; F24H 7/00; F24H 7/002; F24H 7/06; H01L 23/42; H01L 23/427; H01L 23/4275
USPC ..... 165/4, 10, 104.19, 104.21; 392/339, 344
See application file for complete search history.

(56) References Cited

U.S. PATENT DOCUMENTS

| | | | | |
|---|---|---|---|---|
| 4,460,546 A | * | 7/1984 | Kapralis | A61F 7/03 126/263.04 |
| 4,503,838 A | * | 3/1985 | Arrhenius | C09K 5/063 126/263.03 |
| 4,561,493 A | * | 12/1985 | Yanadori | F28D 20/02 165/10 |
| 4,696,338 A | * | 9/1987 | Jensen | F28D 20/025 165/10 |
| 5,378,337 A | * | 1/1995 | Kiyomura | F28D 20/028 204/230.3 |
| 5,954,119 A | * | 9/1999 | Yamamura | F28D 20/02 126/263.01 |
| 2002/0031339 A1 | | 3/2002 | Hirano | |
| 2011/0239673 A1 | * | 10/2011 | Junge | F28D 20/02 62/238.7 |
| 2011/0302940 A1 | * | 12/2011 | Youn | F25D 17/062 62/129 |
| 2013/0240180 A1 | * | 9/2013 | Neuzil | F28D 15/04 165/104.26 |
| 2013/0255602 A1 | * | 10/2013 | Haupts | F28D 20/00 123/41.14 |
| 2014/0131012 A1 | * | 5/2014 | Yagi | F28D 20/028 165/104.21 |
| 2014/0262126 A1 | * | 9/2014 | Ishii | B60H 1/00492 165/10 |

FOREIGN PATENT DOCUMENTS

| | | | | |
|---|---|---|---|---|
| JP | 7-055376 | | 3/1995 | |
| JP | 2002-081878 | | 3/2002 | |
| JP | 2004-003832 | | 1/2004 | |
| JP | 2004003832 | * | 1/2004 | ........... F28D 20/003 |
| JP | 2004003832 A | * | 1/2004 | ............ F28D 20/00 |
| JP | 2007-321996 | | 12/2007 | |

* cited by examiner

METHOD FOR FORMING CRYSTAL NUCLEUS IN LATENT HEAT STORAGE MATERIAL AND HEAT STORAGE DEVICE

BACKGROUND

1. Technical Field

The present disclosure relates to a method for forming a crystal nucleus in a latent heat storage material and a heat storage device.

2. Description of the Related Art

In the past, a study of a latent heat storage material using latent heat which is accumulated when the latent heat storage material changes from a solid phase to a liquid phase and is released when the latent heat storage material changes from the liquid phase to the solid phase has been conducted.

Figure 13:
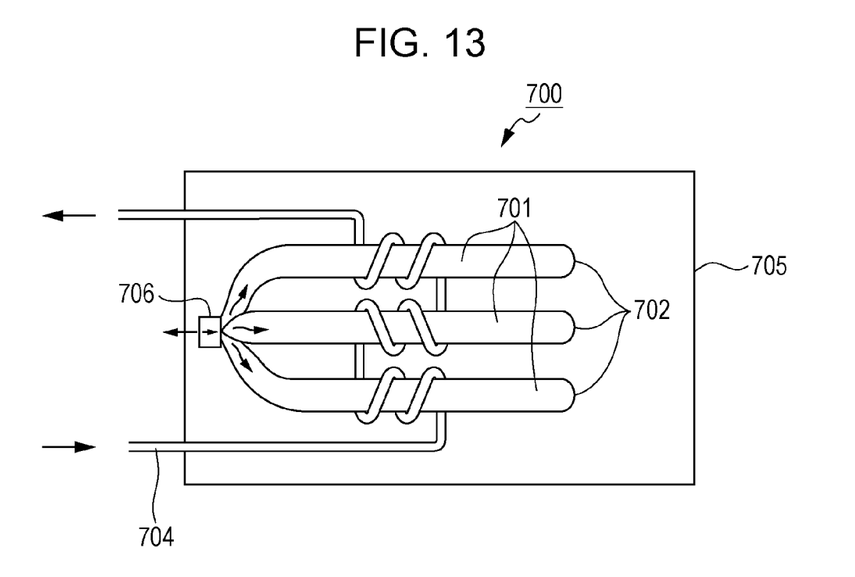
FIG. 13 is a diagram depicting the structure of an existing heat storage type heater body.

For example, in Japanese Patent No. 3588630, as depicted in FIG. 13, a heat storage type heater body 700 using a heat storage material 701 which can be supercooled is described. The heat storage type heater body 700 includes the heat storage material 701, a container 702, a heat exchanger 704, an outer frame 705, and a thermoelectric element 706. The container 702 is a container to be filled with the heat storage material 701. The heat exchanger 704 is a heat exchanger for supplying heat to the heat storage type heater body 700. The heat from the heat storage type heater body 700 is released by using the outer frame 705 as a radiating surface.

The thermoelectric element 706 is a means for terminating the supercooled state of the heat storage material 701, and, when a voltage is applied to the thermoelectric element 706, part of the thermoelectric element 706, the part located on the side thereof where the heat storage material 701 is located, is cooled. When the temperature of part of the heat storage material 701 reaches a temperature at which a crystal nucleus is formed in a supercooled state, a crystal nucleus is formed. The formation of the crystal nucleus triggers the solidification of the heat storage material 701, and heat with a temperature at the melting point of the heat storage material 701 is released.

Japanese Patent No. 3588630 includes the description of the use of a piezoelectric element, an agitator such as an electric vibrator, a pipe through which a low-temperature fluid passes, or an electrode in place of the thermoelectric element 706 as the means for terminating the supercooling state of the heat storage material 701. If the pipe through which the low-temperature fluid passes is used as the means for terminating the supercooling state of the heat storage material 701, the formation of a crystal nucleus is caused by the low-temperature fluid, temperature of which is lower than a temperature at which the heat storage material 701 forms a crystal nucleus in a supercooled state. If the agitator is used as the means for terminating the supercooling state of the heat storage material 701, the positions of some of the molecules of the heat storage material 701 are forcefully changed by the agitator from the outside, whereby the crystallization of the heat storage material 701 is induced. If the electrode is used as the means for terminating the supercooling state of the heat storage material 701, an electric force is applied to part of the heat storage material 701 by the application of a voltage from the outside, whereby a molecular cluster which is greater than or equal to the radius of a critical nucleus is formed. In Japanese Patent No. 3588630, a technique of inducing the crystallization of the heat storage material 701 by forcefully changing the positions of the molecules of the heat storage material 701 from the outside by spark discharge is also disclosed.

SUMMARY

One non-limiting and exemplary embodiment provides a method for forming a crystal nucleus, the method forming a crystal nucleus more reliably in a latent heat storage material.

In one general aspect, the techniques disclosed here feature a method for forming a crystal nucleus in a latent heat storage material containing a solvent and a dissolved substance. The solvent contains water as the main ingredient. The latent heat storage material retains latent heat in a supercooled state. The method includes: (a) heating or cooling part of the latent heat storage material in the supercooled state to cause precipitation of an anhydride of the dissolved substance; and (b) supplying a droplet comprising water to the anhydride, to terminate the supercooled state of the latent heat storage material, and make the latent heat storage material dissipate heat.

With the above-described method for forming a crystal nucleus, it is possible to form a crystal nucleus more reliably in a latent heat storage material.

It should be noted that general or specific embodiments may be implemented as a device, an apparatus, a system, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

A latent heat storage material containing sodium acetate trihydrate can be taken up as an example of a latent heat storage material. Sodium acetate trihydrate has the following properties: a freezing point of 58° C. and an amount of latent heat (heat of solidification) of 250 J/g. Therefore, the latent heat storage material containing sodium acetate trihydrate is suitable for storing the exhaust heat having a relatively low temperature which is lower than 100° C. in high density, and, for example, the use thereof as an auxiliary heat source for warming up or heating in an automobile is possible. Moreover, sodium acetate trihydrate has the property of entering a supercooled state in which sodium acetate trihydrate does not initiate a phase change even when sodium acetate trihydrate is cooled to a temperature below a freezing point after dissolving completely at a temperature which is higher than or equal to the freezing point and maintains the liquid phase state. As long as the supercooled state is maintained, the latent heat is retained. That is, such a latent heat storage material changes from the solid phase to the liquid phase due to a rise in the temperature thereof as a result of being provided with the exhaust heat and stores the latent heat and the sensible heat. After the supply of the exhaust heat is stopped, the sensible heat is released from the latent heat storage material into cold outside air as time passes. However, even when the temperature of the latent heat storage material becomes lower than the freezing point, the latent heat is retained as a result of the supercooled state being maintained. In the latent heat storage material containing sodium acetate trihydrate, by growing a crystal by forming a crystal nucleus, this supercooled state can be terminated. If the termination of the supercooled state in the latent heat storage material can be controlled appropriately, it is possible to store heat for a long period of time without using a heat insulator or the like and release the latent heat stored in the latent heat storage material at appropriate time in accordance with demand. The same goes for many latent heat storage materials other than the latent heat storage material containing sodium acetate trihydrate.

As described above, in Japanese Patent No. 3588630, some means for terminating the supercooling state of the heat storage material 701 which can be supercooled are proposed. However, even when the heat storage material 701 is locally cooled to a temperature at which a crystal nucleus is formed by using the thermoelectric element 706 or the pipe through which the low-temperature fluid passes as the means for terminating the supercooling state of the heat storage material 701, there is a possibility that a crystal nucleus is not formed promptly. Actually, in the experiment conducted by the inventors, it sometimes took a few hours before a crystal nucleus is formed even when sodium acetate trihydrate in a supercooled state was cooled to −20° C. In this case, it is difficult to release the latent heat stored in the heat storage material 701 at appropriate time in accordance with demand. Moreover, if the agitator or the electrode is used as the means for terminating the supercooling state of the heat storage material 701, there is a possibility that a crystal nucleus cannot be formed reliably. Actually, the inventors applied vibrations by ultrasonic vibrations to sodium acetate trihydrate in a supercooled state, applied a several-volt alternating voltage and direct voltage thereto by the electrode, or generated spark discharge by applying thereto a voltage which is greater than or equal to 1000 volts. However, in any of these cases, the inventors could not form a crystal nucleus reliably. That is, there is room for improvement of the heat storage type heater body described in Japanese Patent No. 3588630 from the viewpoint of forming a crystal nucleus promptly and reliably in the heat storage material 701 in a supercooled state.

In view of the above-described circumstances, it is necessary to study another method by which a crystal nucleus can be formed reliably and promptly in a latent heat storage material.

A first aspect of the present disclosure provides a method for forming a crystal nucleus in a latent heat storage material containing a solvent and a dissolved substance. The solvent contains water as the main ingredient. The latent heat storage material retains latent heat in a supercooled state. The method includes: (a) separating out an anhydride of the dissolved substance by heating or cooling part of the latent heat storage material in the supercooled state; and (b) supplying a droplet comprising water to the anhydride or the surface of the latent heat storage material on which the anhydride has been separated out, to terminate the supercooled state of the latent heat storage material, and make the latent heat storage material dissipate heat.

In accordance with the first aspect, as a result of the droplet comprising water being supplied in the step (b) to the anhydride separated out in the step (a) or the surface on which the anhydride of the latent heat storage material has been separated out, the anhydride dissolves and a concentration gradient appears, and a crystal nucleus of a hydrate of the dissolved substance, for example, is formed. As a result, the crystal nucleus is formed in the latent heat storage material and a crystal growth occurs in the latent heat storage material, whereby the latent heat stored in the latent heat storage material is released.

A second aspect of the present disclosure provides the method for forming a crystal nucleus, in which, in addition to the first aspect, the latent heat storage material is contained in a container in such a way that a space in contact with the surface of the latent heat storage material is formed in the container. In the step (a), the part of the latent heat storage material in the supercooled state is heated by heating the space or the surface, to evaporate part of the solvent from the surface, and separate out the anhydride of the dissolved substance on the surface. The step (b) further includes forming the droplet by condensing the moisture contained in the space.

In accordance with the second aspect, it is possible to separate out an anhydride by evaporating part of the solvent in the step (a) and form the droplet to be supplied in the step (b) by using the moisture contained in the space in contact with the surface of the latent heat storage material, the space formed in the container.

A third aspect of the present disclosure provides the method for forming a crystal nucleus, in which, in addition to the first aspect or the second aspect, the dissolved substance is a salt and a crystal nucleus of a hydrate of the dissolved substance is formed in the step (b).

A fourth aspect of the present disclosure provides a heat storage device including: a latent heat storage material containing a solvent and a dissolved substance, the solvent containing water as the main ingredient, the latent heat storage material that retains latent heat when the latent heat storage material is in a supercooled state; a container containing the latent heat storage material; a heater adapted to heat part of the latent heat storage material in the supercooled state to separate out an anhydride of the dissolved substance or a cooler adapted to cool part of the latent heat storage material in the supercooled state to separate out an anhydride of the dissolved substance; and a droplet feeder adapted to supply a droplet comprising water to the anhydride or a surface of the latent heat storage material on which the anhydride is located, to terminate the supercooled state of the latent heat storage material, and make the latent heat storage material dissipate heat.

In accordance with the fourth aspect, it is possible to provide the heat storage device that is used in the method for forming a crystal nucleus according to any one of the first to third aspects.

A fifth aspect of the present disclosure provides the heat storage device, in which, in addition to the fourth aspect, the heater is included. The container has a space in contact with the surface of the latent heat storage material therein. The heater is adapted to heat the part of the latent heat storage material in the supercooled state by heating the space or the surface, to evaporate part of the solvent from the surface, and separate out the anhydride of the dissolved substance.

A sixth aspect of the present disclosure provides the heat storage device, in which, in addition to the fifth aspect, the droplet feeder includes a space cooler that cools the space in such a way as to form the droplet by condensing the moisture contained in the space. In accordance with the sixth aspect, it is possible to cool the space in contact with the surface of the latent heat storage material in order to form the droplet to be supplied to the anhydride or an area near the anhydride by condensing the moisture contained in the space.

A seventh aspect of the present disclosure provides the heat storage device, in which, in addition to any one of the fourth to sixth aspects, the dissolved substance is a salt.

Hereinafter, an embodiment of the present disclosure will be described with reference to the drawings. The following is the description about an example of the present disclosure and the present disclosure is not limited thereby.

<<Method for Forming a Crystal Nucleus in a Latent Heat Storage Material>>

Figure 12:
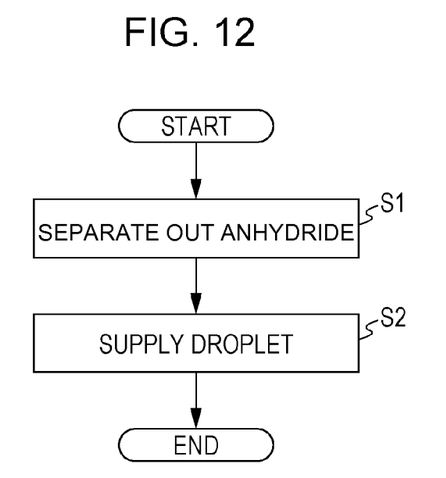
FIG. 12 is a flowchart of the method for forming a crystal nucleus according to an embodiment of the present disclosure.

First, a method for forming a crystal nucleus in a latent heat storage material will be described. FIG. 12 is a flowchart of a method for forming a crystal nucleus according to an embodiment of the present disclosure. A latent heat storage material 11 which is used in the method of this embodiment contains a dissolved substance 11a and a solvent 11b and contains water as the main ingredient of the solvent 11b. In this specification, the "main ingredient" means an ingredient whose content is the highest in terms of mass. In addition to water, the solvent 11b may contain, for example, an organic solvent such as alcohol, ether, or ketone. The method of this embodiment includes step S1 and step S2. Step S1 is a step of separating out an anhydride 12 of the dissolved substance 11a in the latent heat storage material 11. Step S2 is a step of supplying a droplet containing water to the anhydride 12 or an area near the anhydride 12. The anhydride 12 dissolves by the droplet supplied in step S2 and a concentration gradient appears. At this time, for example, as a result of a crystal of a hydrate of the dissolved substance 11a being formed, a crystal nucleus is formed in the latent heat storage material 11.

Figure 1A:
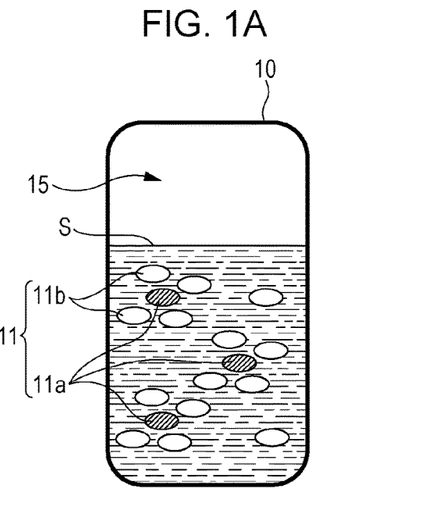
FIGS. 1A to 1D are schematic diagrams conceptually describing a method for forming a crystal nucleus according to an embodiment of the present disclosure.

With reference to FIGS. 1A to 1D, an example of the method for forming a crystal nucleus in the latent heat storage material will be described. First, as depicted in FIG. 1A, the latent heat storage material 11 is contained in a container 10. Here, the latent heat storage material 11 is contained in the container 10 in such a way that a space 15 in contact with a surface S of the latent heat storage material 11 is formed in the container 10. The container 10 is, for example, an airtight container. The space 15 is filled with a gas which does not react chemically with the latent heat storage material 11, such as air, nitrogen, or rare gas. Moreover, the container 10 may be configured such that the space 15 communicates with the outside of the container 10.

The latent heat storage material 11 is a material which can be supercooled. The dissolved substance 11a of the latent heat storage material 11 is not limited to a particular substance and is a salt, for example. Examples of the dissolved substance 11a which is a salt include sodium acetate. Unless otherwise specified, the following description will be given by taking up, as an example, a case in which the dissolved substance 11a is sodium acetate and the latent heat storage material 11 is an aqueous solution containing 45% sodium acetate by mass. In this case, in the latent heat storage material 11, the proportion of water molecules to sodium acetate (the amount of substance of water/the amount of substance of sodium acetate) is 5 to 6. In FIGS. 1A to 1D, the dissolved substance 11a actually ionizes to an acetate ion and a sodium ion and is dispersed in the solvent 11b.

Figure 1B:
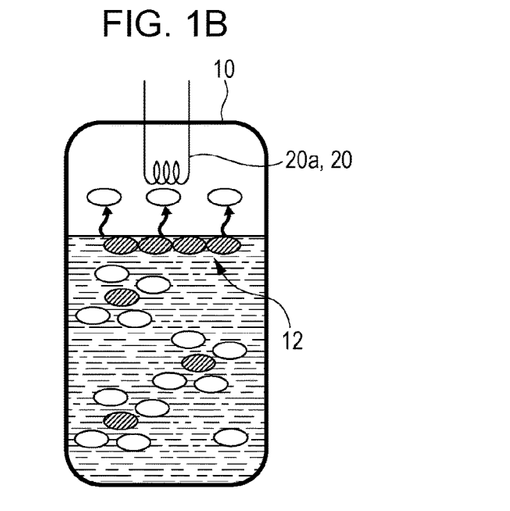

As depicted in FIG. 1B, in step S1, the anhydride 12 of the dissolved substance 11a is separated out by using an anhydride separation unit 20. The anhydride 12 is, for example, an ionic crystal by the dissolved substance 11a, the ionic crystal which does not contain water molecules. As the anhydride separation unit 20, for example, a heater 20a that heats the space 15 or the surface S of the latent heat storage material 11 can be used. In this case, step S1 is a step of separating out the anhydride 12 of the dissolved substance 11a on the surface S of the latent heat storage material 11 by vaporizing part of the solvent 11b from the surface S of the latent heat storage material 11. Specifically, as a result of the space 15 being heated by the heater 20a, for example, the temperature of the space 15 rises. As a result, the amount of saturated vapor in the space 15 increases, part of the solvent 11b is vaporized from the surface S of the latent heat storage material 11, and the concentration of the dissolved substance 11a is locally increased on the surface S of the latent heat storage material 11. Alternatively, for example, the heater 20a heats the surface S of the latent heat storage material 11 by the electromagnetic waves released from the heater 20a. Also in this case, part of the solvent 11b is vaporized from the surface S of the latent heat storage material 11 and the concentration of the dissolved substance 11a is locally increased on the surface S of the latent heat storage material 11.

The heater 20a may be an electric heater that heats the space 15. Alternatively, the heater 20a may be a heat pump device having compressor outlet piping in contact with the space 15. In this case, the temperature of the compressor outlet piping becomes high and a heating medium flowing through the compressor outlet piping and the gas inside the space 15 perform heat exchange, whereby the space 15 is heated. Further, alternatively, the heater 20a may be a heater provided with a thermoelectric element (a Peltier device) attached to the inner wall of the container 10 in such a way as to be in contact with the space 15. In this case, a current flows through the thermoelectric element, a temperature difference is produced between a portion of the thermoelectric element on the side where the space 15 is located and a portion of the container 10 on the side where the inner wall is located, the space 15 is heated, and the side where the inner wall is located is cooled. Moreover, alternatively, the anhydride separation unit 20 may be a unit which uses an external heat source such as the exhaust heat of an automobile. The anhydride separation unit 20 may be, for example, piping which is disposed in the space 15, the piping through which part of an engine coolant temporarily flows.

Figure 2:
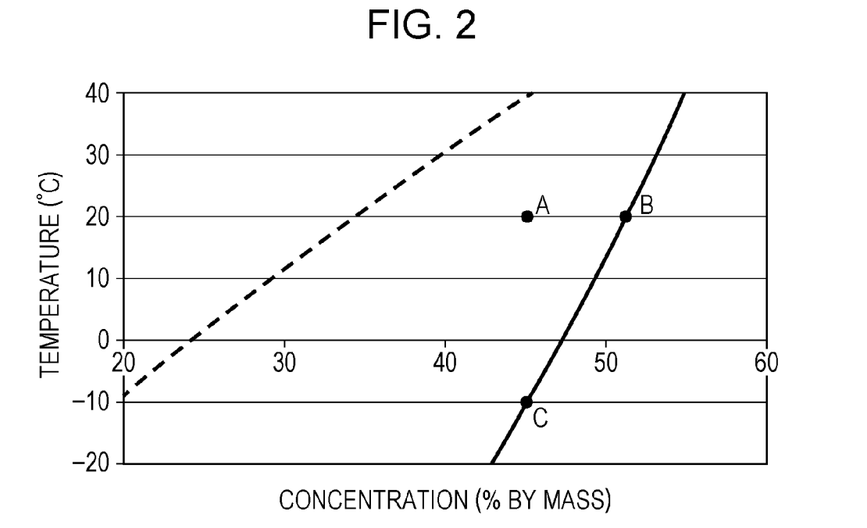
FIG. 2 is a graph showing the relationship between the temperature of a saturated aqueous solution of sodium acetate trihydrate and the concentration thereof and the relationship between the temperature of a saturated aqueous solution of sodium acetate anhydride and the concentration thereof.

Assume that the temperature of the latent heat storage material 11 observed before the start of step S1 is 20° C. In this case, as depicted in FIG. 2, the surface S of the latent heat storage material 11 is in a state indicated by a point A. In FIG. 2, the solid line indicates the relationship between the temperature of a saturated aqueous solution of sodium acetate anhydride and the concentration thereof, and the broken line indicates the relationship between the temperature of a saturated aqueous solution of sodium acetate trihydrate and the concentration thereof. In step S1, when the concentration of the dissolved substance 11a is locally increased on the surface S of the latent heat storage material 11, the concentration of sodium acetate becomes higher than the concentration thereof at a point B on the surface S of the latent heat storage material 11. The concentration at the point B is the concentration (51.4% by mass) of the saturated aqueous solution of sodium acetate anhydride at 20° C. As a result, the anhydride 12 of sodium acetate is separated out on the surface S of the latent heat storage material 11. After the anhydride 12 is separated out, heating by the heater 20a is stopped.

Figure 1C:
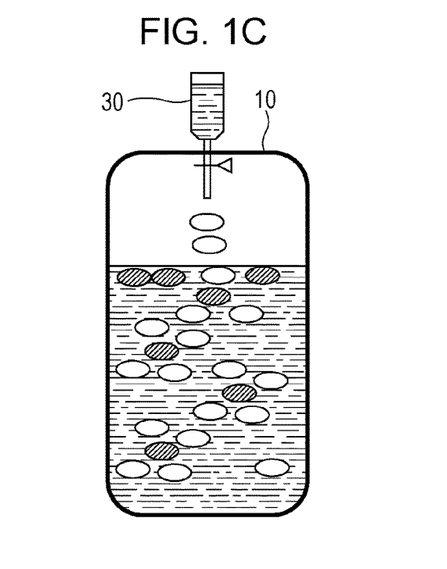

Next, as depicted in FIG. 1C, in step S2, a droplet containing water is supplied to the anhydride 12 or an area near the anhydride 12. For example, the droplet is supplied to the surface S of the latent heat storage material 11. The droplet is supplied by a droplet feeding unit 30, for example. The configuration of the droplet feeding unit 30 is not limited to a particular configuration, and the droplet feeding unit 30 is configured such that the droplet feeding unit 30 can drop a predetermined amount of droplet from the liquid contained in the container by opening and closing of a valve, for example. The droplet feeding unit 30 may be a pipette, for example. It is desirable that the droplet which is supplied to the anhydride 12 or an area near the anhydride 12 contains water as the main ingredient, and the droplet may contain only water. The droplet feeding unit 30 may be a pump that drops a tiny amount of water of an external tank.

Figure 1D:
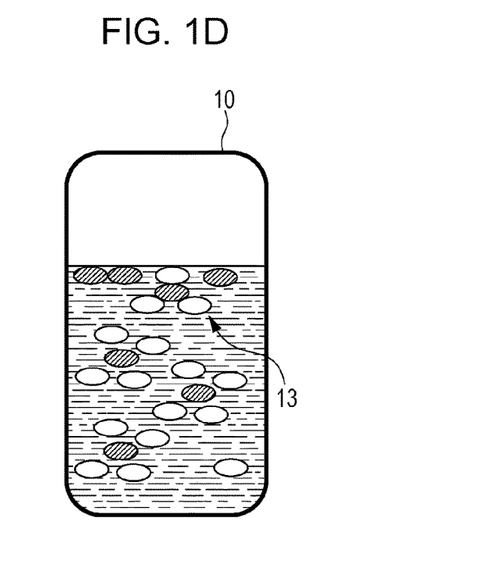

Due to the droplet supplied in step S2, as depicted in FIG. 1C, sodium acetate forming the anhydride 12 dissolves and a concentration gradient appears. As a result, as depicted in FIG. 1D, a crystal nucleus 13 of sodium acetate trihydrate is formed. As just described, in step S2, the crystal nucleus 13 of a hydrate of the dissolved substance 11a is formed. When the crystal nucleus 13 is formed in the latent heat storage material 11 in a supercooled state, a phase change from a liquid phase to a solid phase is started and the latent heat of the latent heat storage material 11 is released in this process. That is, the supercooled state of the latent heat storage material 11 is terminated. At this time, sodium acetate which is the dissolved substance 11a changes from the liquid phase to the solid phase in a state in which sodium acetate hydrates with water which is the main ingredient of the solvent 11b. When the latent heat storage material 11 is the "liquid phase" state, sodium acetate ionizes to an acetate ion and a sodium ion and is dissolved in the solvent 11b. When the latent heat storage material 11 is in the "solid phase" state, a crystal of sodium acetate trihydrate is formed in the latent heat storage material 11.

Modified Examples

The above-described method can be modified from various viewpoints. For example, step S2 may further include forming a droplet by condensing the moisture contained in the space 15. This droplet may be used as the droplet to be supplied in step S2. In this case, the space 15 may be cooled to, on the inner surface of the container 10, condense the moisture contained in the space 15 to form a droplet. For example, the inner surface of the container 10 in contact with the space 15 is cooled. The droplet is formed and moves on the inner surface of the container 10. Thereby the droplet is supplied to the anhydride 12 or an area near the anhydride 12. In this case, part of the inner surface of the container 10 forms part of the droplet feeding unit 30. Alternatively, for example, a cooled member is disposed in the space 15 to cool the space 15. The cooled member condenses the moisture contained in the space 15 to form a droplet. In this case, it is desirable that the member is disposed in the space 15 in such a way that the droplet moves along the member and is supplied to the anhydride 12 or an area near the anhydride 12. When the anhydride separation unit 20 used in step S1 heats part of the latent heat storage material 11, the droplet feeding unit 30 may circulates, in the container 10, the water evaporated from the latent heat storage material 11 by heating. That is, the droplet feeding unit 30 may use the water released from the latent heat storage material 11 into the space 15 by heating as a droplet by condensing the water.

Step S1 may be a step of separating out the anhydride 12 of the dissolved substance 11a by locally cooling the surface S of the latent heat storage material 11. In this case, for example, the surface S of the latent heat storage material 11 is locally cooled by a cooler such as a thermoelectric element. When the latent heat storage material 11 is an aqueous solution containing 45% sodium acetate by mass, if the surface S of the latent heat storage material 11 is cooled to −10° C. or lower, the state of the latent heat storage material 11 changes from the state at the point A of FIG. 2 to the state at a point C. In FIG. 2, the solid line indicates the relationship between the temperature of the saturated aqueous solution of sodium acetate anhydride and the concentration thereof, and the broken line indicates the relationship between the temperature of the saturated aqueous solution of sodium acetate trihydrate and the concentration thereof. In this case, the concentration of the saturated aqueous solution of sodium acetate anhydride falls below 45% by mass, and the anhydride 12 of sodium acetate is separated out. In other words, in step S1, the surface S of the latent heat storage material 11 is locally cooled in such a way that the concentration of the saturated aqueous solution of the dissolved substance 11a falls below the concentration of the dissolved substance 11a in the latent heat storage material 11 observed before step S1.

The cooler which is the anhydride separation unit 20 in step S1 may be a thermoelectric element attached to the outer wall of the container 10 such that the thermoelectric element can cool part of the latent heat storage material 11 via the container 10. Alternatively, the cooler which is the anhydride separation unit 20 may be a heat pump device having expansion valve outlet piping in contact with the container 10. In this case, the temperature of the expansion valve outlet piping drops and heat exchange is performed via the container 10, whereby part of the latent heat storage material 11 is cooled. Further, alternatively, the anhydride separation unit 20 may be a unit that uses an external cold source. The anhydride separation unit 20 may be, for example, a duct that takes in a cold outside air and sprays the air on the container 10.

As the dissolved substance 11a of the latent heat storage material 11, salts other than sodium acetate may be used. As the dissolved substance 11a, for example, sodium sulfate, disodium hydrogenphosphate, calcium chloride, sodium carbonate, or sodium thiosulfate may be used. Each of the aqueous solutions thereof can be supercooled and can form a crystal of a hydrate. Sodium sulfate can form a crystal of sodium sulfate decahydrate by hydration. Disodium hydrogenphosphate can form a crystal of disodium hydrogenphosphate dodecahydrate by hydration. Calcium chloride can form a crystal of calcium chloride hexahydrate by hydration. Sodium carbonate can form a crystal of sodium carbonate decahydrate by hydration. Sodium thiosulfate can form a crystal of sodium thiosulfate pentahydrate by hydration. To the latent heat storage material 11, a thickener or polysaccharide may be added as a phase separation inhibitor.

<<Heat Storage Device>>

Next, a heat storage device which is used in the above-described method for forming a crystal nucleus in the latent heat storage material 11 will be described. The above description about the latent heat storage material 11 also applies to the following description unless a technical contraction arises.

First Embodiment

Figure 3:
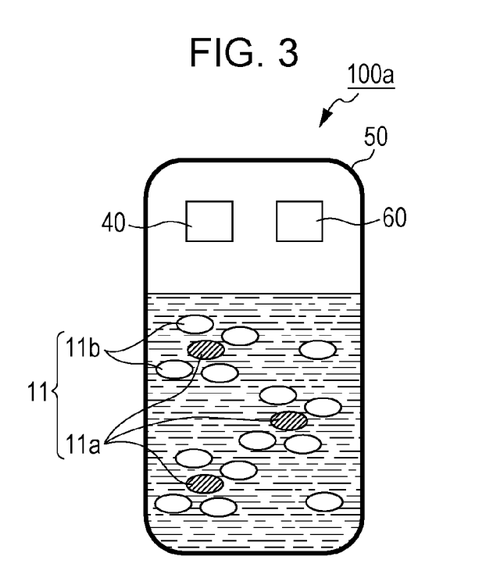
FIG. 3 is a schematic diagram conceptually describing a heat storage device according to a first embodiment.

As depicted in FIG. 3, a heat storage device 100a according to a first embodiment includes a latent heat storage material 11, a container 50, an anhydride separation unit 40, and a droplet feeding unit 60. As described earlier, the latent heat storage material 11 contains a dissolved substance 11a and a solvent 11b and contains water as the main ingredient of the solvent 11b. The dissolved substance 11a is, for example, a salt. Unless otherwise specified, the following description will be given by taking up, as an example, a case in which the latent heat storage material 11 is an aqueous solution containing 45% sodium acetate by mass.

Figure 4:
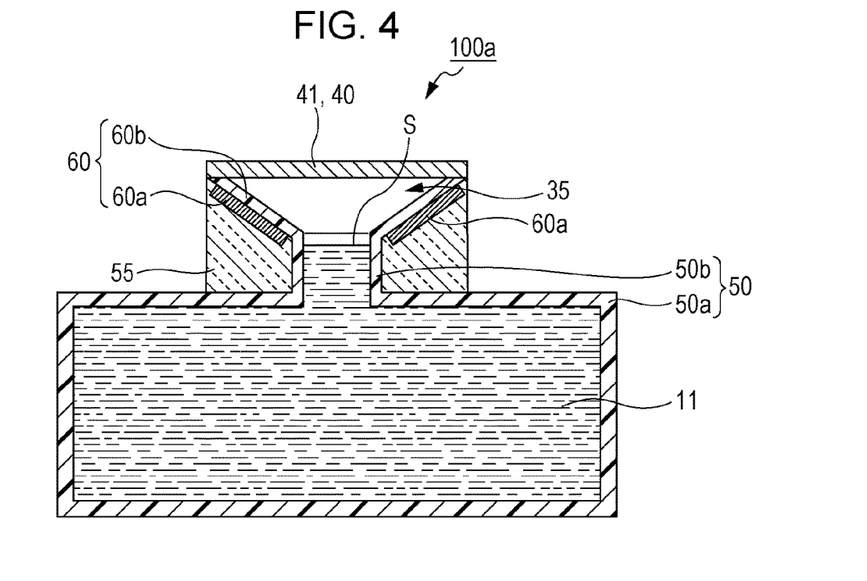
FIG. 4 is a sectional view describing a specific structure of the heat storage device according to the first embodiment.

As depicted in FIG. 4, the container 50 contains the latent heat storage material 11. The latent heat storage material 11 is contained in the container 50 in such a way that a space 35 in contact with the surface S of the latent heat storage material 11 is formed in the container 50. The container 50 includes a main body section 50a and an extended section 50b. The main body section 50a forms a space for containing most of the latent heat storage material 11. The extended section 50b is formed so as to jut upward from the main body section 50a. As depicted in FIG. 4, the extended section 50b has a funnel-like shape. That is, the extended section 50b has an internal space formed as a result of a space shaped like an inverted truncated cone spreading upward from a cylindrical space. In the cylindrical internal space of the extended section 50b, the surface S of the latent heat storage material 11 is formed. An internal space in the extended section 50b, the internal space located above the surface S of the latent heat storage material 11, forms the space 35. The space 35 is filled with a gas which does not react chemically with the latent heat storage material 11, such as air, nitrogen, or rare gas. The size of the extended section 50b is not limited to a particular size, and the inside diameter of a portion forming the cylindrical space of the extended section 50b is, for example, 10 mm. A portion forming the space of the extended section 50b, the space shaped like an inverted truncated cone, is configured so as to form, for example, a space shaped like an inverted truncated cone, the space having a height of 5 mm and an upper diameter of 400 mm. As a result, the space 35 has a volumetric capacity of about 644,000 mm$^3$.

The main body section 50a is formed of a material having good thermal conductivity and flexibility, such as a film formed by laminating resin on aluminum foil or a resin film onto which aluminum is evaporated. As a result, the main body section 50a can follow a change in the volume of the latent heat storage material 11 associated with a change in temperature.

The anhydride separation unit 40 has the function of separating out an anhydride of the dissolved substance 11a in the latent heat storage material 11. In this embodiment, the anhydride separation unit 40 is a temperature adjuster for locally heating or cooling the latent heat storage material 11. Specifically, the anhydride separation unit 40 is a heater 41 that heats the space 35 or the surface S of the latent heat storage material 11. The heater 41 heats the space 35 or the surface Sin such a way as to vaporize part of the solvent 10b from the surface S of the latent heat storage material 11. The heater 41 is, for example, a plate-like electric heater and can increase the temperature of the space 35 to about 90° C. The heater 41 is disposed above the extended section 50b in such a way as to cover the space 35. As a result, the space 35 is formed as an enclosed space. Since the space 35 contains a space shaped like an inverted truncated cone, the heater 41 has a heating surface area which is sufficiently larger than the surface S of the latent heat storage material 11. This makes it possible to release much heat into the space 35 from the heater 41 and heat the space 35 promptly. The heater 41 may be configured such that the heater 41 can radiate electromagnetic waves for heating the surface S of the latent heat storage material 11 toward the surface S.

The droplet feeding unit 60 is configured to supply a droplet containing water to the anhydride of the dissolved substance 11a or to an area near the anhydride. The anhydride is separated out by using the anhydride separation unit 40. In this embodiment, the droplet feeding unit 60 includes an inner surface 60b forming the space 35 in the extended section 50b. Furthermore, the droplet feeding unit 60 includes a space cooler 60a that cools the space 35. The space cooler 60a cools the space 35 in such a way as to form a droplet by condensing the moisture contained in the space 35. The space cooler 60a is formed of a thermoelectric element having an output of 50 W, for example, and can lower the temperature of the space 35 from about 90° C. to about 20° C. The configuration and output of the space cooler 60a are not limited to particular configuration and output as long as the space cooler 60a can form a droplet by condensing the moisture in the space 35. As depicted in FIG. 4, the space cooler 60a is disposed in such a way as to make contact with an outer surface of the extended section 50b, the outer surface on the side opposite to the inner surface 60b. The inner surface 60b is cooled by the action of the space cooler 60a and the moisture in the space 35 is condensed, whereby a droplet is formed on the inner surface 60b.

This droplet moves on the inner surface 60b and is supplied to the surface S of the latent heat storage material 11. The inner surface 60b has an inclined portion having an inclination with respect to the surface S of the latent heat storage material 11 so as to facilitate the flow of the droplet to the surface S of the latent heat storage material 11. Moreover, desirably, a portion of the inner surface 60b in which the inclination thereof changes is rounded such that the surface tension acting on the droplet is reduced. Furthermore, water repellent finishing may be performed on the inner surface 60b by surface treatment such as etching, sandblasting, or coating of a water repellent so as to facilitate the flow of the droplet to the surface S of the latent heat storage material 11. The shape of the inner surface 60b is not limited to a particular shape as long as the shape thereof can make the droplet attached to the inner surface 60b flow toward the surface S of the latent heat storage material 11.

It is desirable that the volumetric capacity of the space 35 is determined in such a way that 1 mm³ or more of the solvent 11b can evaporate from the surface S of the latent heat storage material 11, the surface S abutting on the space 35, by heating by the heater 41. The volumetric capacity of the space 35 satisfying such a condition can be determined based on a difference between the amount of saturated vapor at the temperature of the space 35 observed when the space 35 or the surface S of the latent heat storage material 11 is heated by the heater 41 and the amount of saturated vapor at the temperature of the space 35 observed when a crystal nucleus is formed in the latent heat storage material 11.

It is desirable that the volumetric capacity of the space 35 is as small as possible in order to improve the efficiency of the container 50 in filling the latent heat storage material 11 therein. Since the volumetric capacity of the space 35 is proportional to the area of the surface S of the latent heat storage material 11, the surface S abutting on the space 35, it is desirable that the surface S of the latent heat storage material 11, the surface S abutting on the space 35, is as small as possible in order to improve the efficiency of the container 50 in filling the latent heat storage material 11 therein.

The heat storage device 100a further includes a heat insulator 55. The heat insulator 55 covers a portion of the outer surface of the extended section 50b, the portion that is not in contact with the heater 41 and the space cooler 60a. This makes it possible to reduce heat loss.

Next, by taking up, as an example, a case in which the space 35 is heated by the heater 41, part of the operation of the heat storage device 100a will be described. First, the space 35 is heated by the heater 41. Since the boiling point of the sodium acetate solution is about 120° C., it is desirable that the target temperature of the heater 41 is set at 115° C. or lower so as to prevent the boiling of the latent heat storage material 11. For example, by heating by the heater 41, the temperature of the space 35 rises from about 20° C. to about 90° C. As a result, part of the solvent 11b evaporates from the surface S of the latent heat storage material 11. For example, the amount of heat required for the evaporation of the solvent 11b is supplied from the heater 41 in about 15 to 30 seconds after the start of heating by the heater 41. At this time, about 0.26 g (=about 260 mm³) of the solvent evaporates. As a result, the sodium acetate solution enters in a supersaturated state in an area from the surface S of the latent heat storage material 11 to a depth of 10 mm. The substantial concentration of sodium acetate in this area rises to 65% or higher by mass. As a result, an anhydride of sodium acetate is separated out on the surface S of the latent heat storage material 11.

The amounts of heat supplied from the heater 41 to the space 35 are added up based on the electric power consumption of the heater 41, and it is determined whether or not the amount of heat obtained by adding up exceeds a predetermined threshold value. This makes it possible to determine whether or not the anhydride of sodium acetate has been separated out on the surface S of the latent heat storage material 11. The predetermined threshold value is set in consideration of, for example, the energy required for heating of the space 35 and the evaporation of the solvent 11b and heat loss to the outside. The predetermined threshold value is, for example, 1.5 kJ. In this case, it is determined that the anhydride of sodium acetate has been separated out in about 20 to 30 seconds after the start of heating by the heater 41. If it is determined that the anhydride of sodium acetate has been separated out, heating by the heater 41 is stopped. It may be determined whether or not the anhydride of sodium acetate has been separated out by observing the surface S of the latent heat storage material 11.

Next, the space 35 is cooled by operating the space cooler 60a. As a result, the moisture contained in the space 35 is condensed and a droplet containing water adheres to the inner surface 60b. When the thermoelectric element having an output of 50 W is used as the space cooler 60a, a droplet containing water adheres to the inner surface 60b in about 15 to 30 seconds after the start of the operation of the space cooler 60a. This droplet moves on the inner surface 60b by the action of gravity and is supplied to the surface S of the latent heat storage material 11. The anhydride separated out on the surface S of the latent heat storage material 11 dissolves as a result of making contact with the droplet, and a crystal nucleus of sodium acetate trihydrate is formed. At this time, the temperature of the latent heat storage material 11 rises rapidly with the termination of the supercooled state. By detecting this rapid rise in temperature by a temperature sensor (whose illustration is omitted) provided so as to be in contact with the container 50, it is possible to determine the presence or absence of the formation a crystal nucleus in the latent heat storage material 11. If it is determined that a crystal nucleus has been formed in the latent heat storage material 11, cooling by the space cooler 60a is stopped.

A crystal nucleus of sodium acetate trihydrate can be formed with a supply of at least one droplet adhering to the inner surface 60b to the surface S of the latent heat storage material 11. Thus, the space 35 does not have to be cooled by the space cooler 60a to the temperature of the space 35 observed before heating by the heater 41 is performed. Moreover, if the space cooler 60a is formed of the thermoelectric element, the thermoelectric element may be used to heat the space 35 when an anhydride of sodium acetate is separated out.

Modified Examples

The heat storage device 100a can be modified from various viewpoints. For example, the heat storage device 100a may be modified like a heat storage device 100b according to a first modified example depicted in FIG. 5. Unless otherwise specified, the heat storage device 100b is configured in a manner similar to the heat storage device 100a. Component elements of the heat storage device 100b which are identical or correspond to the component elements of the heat storage device 100a are identified with the same characters as the component elements of the heat storage device 100a, and the detailed descriptions thereof are omitted. The description about the first embodiment also applies to the first modified example unless a technical contraction arises. The same goes for second to fourth modified examples.

Figure 5:
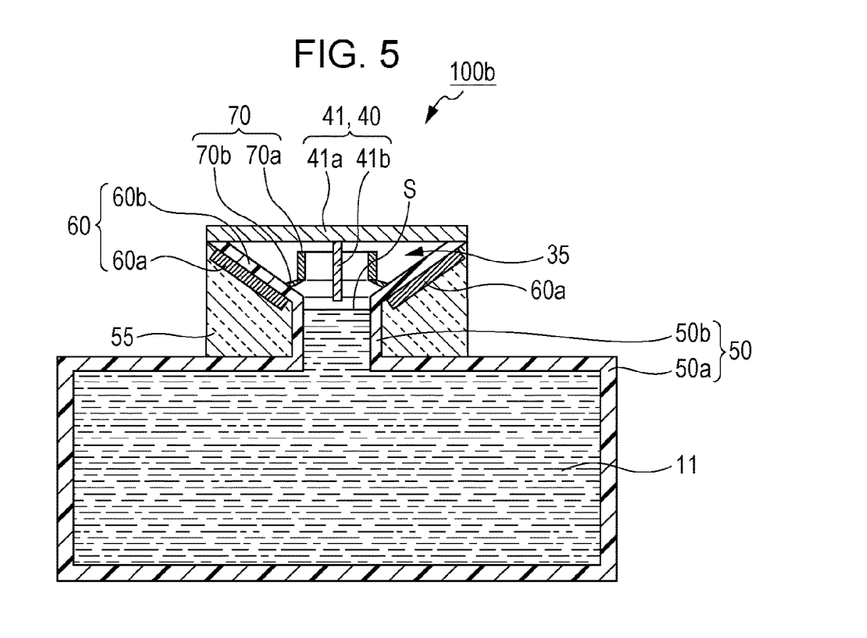
FIG. 5 is a sectional view of a heat storage device according to a first modified example.

In the heat storage device 100b, the heater 41 includes a base section 41a and a projection 41b. The base section 41a is disposed above the extended section 50b so as to cover the space 35. The projection 41b juts downward from the base section 41a. Moreover, the heat storage device 100b includes a partition member 70. The partition member 70 is disposed in the space 35. The partition member 70 includes a cylindrical tube portion 70a and a leg portion 70b. The partition member 70 is disposed in the space 35 in such a way that the tube portion 70a surrounds the projection 41b and the leg portion 70b supports the partition member 70 by making contact with the inclined portion of the inner surface 60b. When the heater 41 heats the space 35, the temperature easily rises in the tube portion 70a by heating by the projection 41b. This easily produces an upward current in the tube portion 70a. On the other hand, outside the tube portion 70a, the temperature tends to be lowered because heat is radiated to the outside of the container 50 and a downward current is easily produced. As described above, the air inside the space 35 flows and circulates inside and outside the tube portion 70a, which makes it possible to promote the evaporation of the solvent 11b from the surface S of the latent heat storage material 11.

Figure 6:
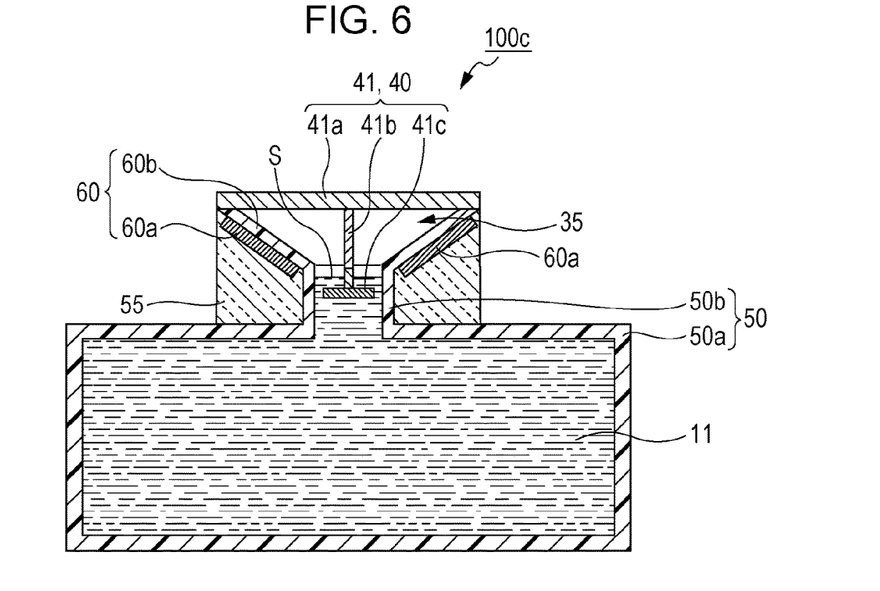
FIG. 6 is a sectional view of a heat storage device according to a second modified example.

The heat storage device 100a may be modified like a heat storage device 100c according to the second modified example depicted in FIG. 6. The heater 41 of the heat storage device 100c includes a base section 41a and a projection 41b as is the case with the heater 41 of the heat storage device 100b. The heater 41 of the heat storage device 100c further includes a tip 41c. The tip 41c is connected to an end of the projection 41b on the side opposite to the base section 41a. The tip 41c makes contact with the latent heat storage material 11. The heater 41 of the heat storage device 100c is configured such that the set temperature of the base section 41a and the projection 41b and the set temperature of the tip 41c can be changed individually. In the heater 41 of the heat storage device 100c, the tip 41c can supply energy required for the vaporization of the solvent 11b. Moreover, in the heater 41 of the heat storage device 100c, the base section 41a and the projection 41b can supply heat energy required for the evaporated solvent 11b to maintain the vapor phase state in the space 35. As a result, the evaporation of the solvent 11b from the surface S of the latent heat storage material 11 can be promoted.

Figure 7:
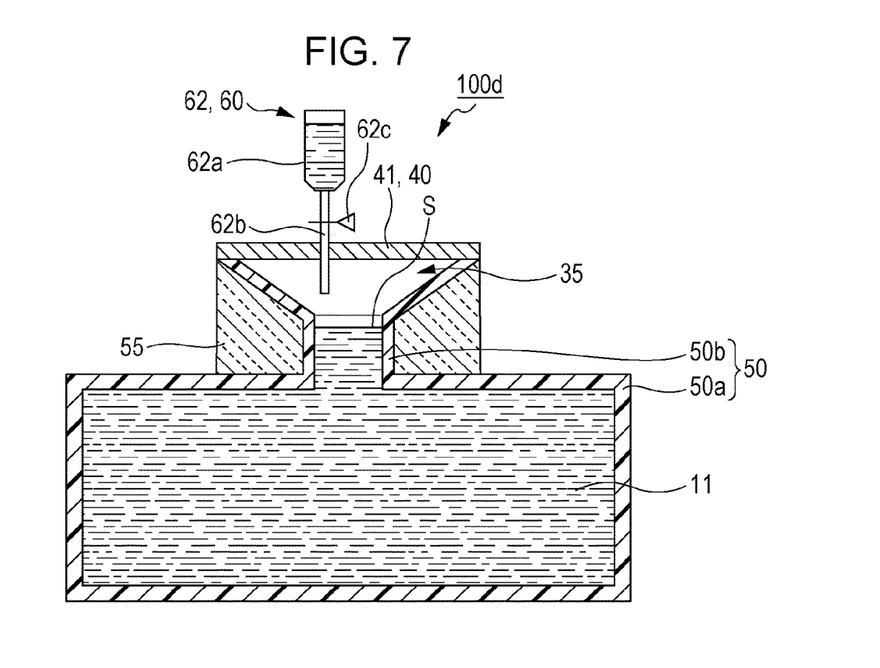
FIG. 7 is a sectional view of a heat storage device according to a third modified example.

The heat storage device 100a may be modified like a heat storage device 100d according to the third modified example depicted in FIG. 7. The heat storage device 100d does not have the space cooler 60a of the heat storage device 100a. The heat storage device 100d includes a dropping device 62 as the droplet feeding unit 60. The dropping device 62 is a device for dropping a predetermined amount of liquid. The dropping device 62 includes a housing section 62a, a nozzle 62b, and a valve 62c. A liquid for forming a droplet to be supplied to an anhydride of the dissolved substance 11a or an area near the anhydride is contained in the housing section 62a. The liquid contained in the housing section 62a is an aqueous solution of the dissolved substance 11a or water, the aqueous solution having a lower concentration than the concentration of the saturated aqueous solution of the anhydride of the dissolved substance 11a. The nozzle 62b extends downward from the housing section 62a to the surface S of the latent heat storage material 11. The liquid contained in the housing section 62a flows through the nozzle 62b and drops on the surface S of the latent heat storage material 11 from the tip of the nozzle 62b. The valve 62c is a valve for opening and closing a flow channel formed in the nozzle 62b. As a result of the opening and closing of the valve 62c being controlled, the amount of the liquid to be dropped is adjusted. Since it is possible to supply a droplet containing water to the anhydride of the dissolved substance 11a or an area near the anhydride with the dropping device 62, as is the case with the heat storage device 100a, a crystal nucleus of the hydrate of the dissolved substance 11a is formed in the latent heat storage material 11 by hydration of the dissolved substance 11a.

In the heat storage device 100d, the space 35 is an enclosed space. However, the space 35 may communicate with the outside of the container 50. At this time, the solvent 11b evaporated from the latent heat storage material 11 by heating by the heater 41 is released to the outside of the container 50. In this case, the amount of liquid to be dropped by the dropping device 62 may be set to an amount which is equal to the amount of the solvent 11b released to the outside of the container 50, the amount measured by a weight measuring device (whose illustration is omitted). This makes it possible to suppress a temporal change in the concentration of the dissolved substance 11a in the latent heat storage material 11.

Moreover, in the heat storage device 100d, as the droplet feeding unit 60, a pipette may be used in place of the dropping device 62.

Figure 8:
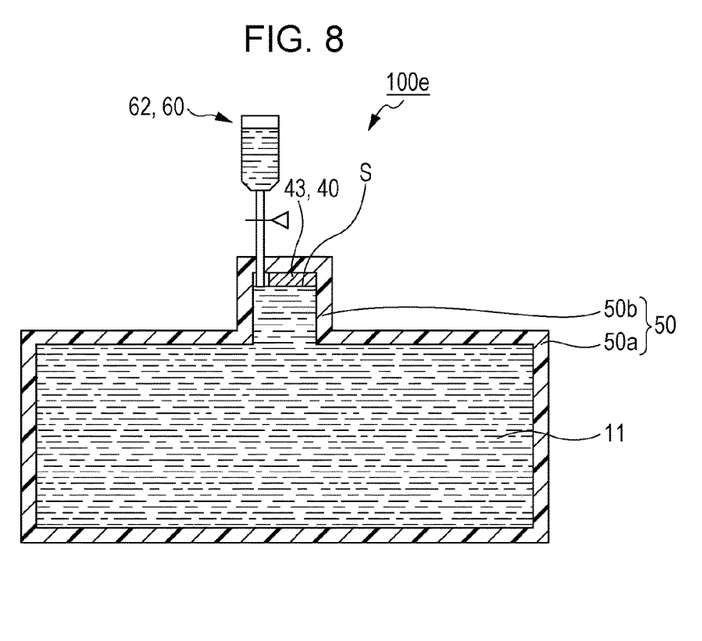
FIG. 8 is a sectional view of a heat storage device according to a fourth modified example.

The heat storage device 100a may be modified like a heat storage device 100e according to the fourth modified example depicted in FIG. 8. The heat storage device 100e includes, as the anhydride separation unit 40, a temperature adjuster 43 (a cooler) for locally cooling the latent heat storage material 11. The cooler 43 is formed of, for example, a thermoelectric element. The cooler 43 makes contact with the surface S of the latent heat storage material 11. The heat storage device 100e includes the dropping device 62 as the droplet feeding unit 60. In the heat storage device 100e, a cylindrical internal space is formed by the extended section 50b and the cooler 43 and the surface S of the latent heat storage material 11 make contact with each other in the internal space. The cooler 43 can cool the surface S of the latent heat storage material 11 in such a way that the substantial concentration of the dissolved substance 11a near the surface S of the latent heat storage material 11 becomes higher than the concentration of the saturated aqueous solution of the anhydride of the dissolved substance 11a. For example, the cooler 43 can cool the surface S of the latent heat storage material 11 to −10° C. or lower. This makes it possible to precipitate the anhydride of the dissolved substance 11a. Moreover, by using the dropping device 62, since a droplet containing water is supplied to the anhydride of the dissolved substance 11a or an area near the anhydride, a crystal nucleus of the hydrate of the dissolved substance 11a is formed by hydration of the dissolved substance 11a.

Second Embodiment

Figure 9:
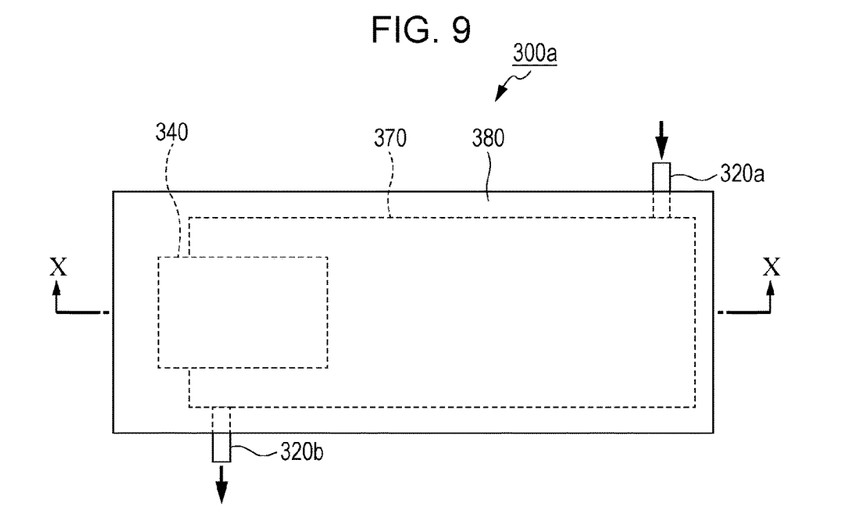
FIG. 9 is a plan view of a heat storage device according to a second embodiment.
Figure 10:
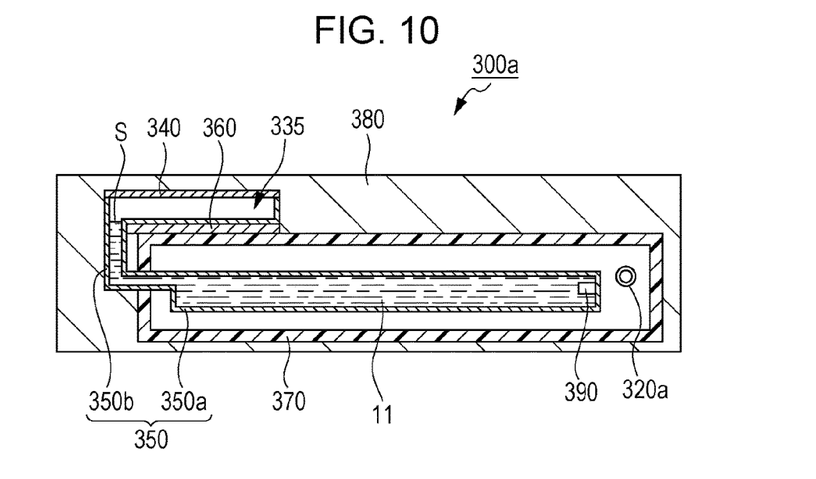
FIG. 10 is a sectional view of the heat storage device according to the second embodiment, the sectional view taken on the line X-X of FIG. 9.

Next, a heat storage device 300a according to a second embodiment will be described. The description about the first embodiment also applies to the second embodiment unless a technical contraction arises. As depicted in FIGS. 9 and 10, the heat storage device 300a includes a latent heat storage material 11, a heat storage container 350, a heat exchange container 370, a heater 340, a space cooler 360, an outer frame 380, a feed pipe 320a, an exhaust pipe 320b, and a temperature sensor 390. The heat storage container 350 has a main body section 350a and an extended section 350b. The latent heat storage material 11 is contained in the heat storage container 350. The heat storage container 350 is formed of a material having good thermal conductivity such as metal.

The heat exchange container 370 surrounds the main body section 350a in such a way as to form a predetermined space between the heat exchange container 370 and the main body section 350a. The space between the outer periphery of the main body section 350a and the inner periphery of the heat exchange container 370 functions as a reservoir space for a heating medium for performing heat exchange with the latent heat storage material 11. The heat exchange container 370 is formed of metal or resin. The heat exchange container 370 is formed of a material having the heat insulation properties, for example. To the heat exchange container 370, the feed pipe 320a and the exhaust pipe 320b are connected. A flow channel formed by the feed pipe 320a and a flow channel formed by the exhaust pipe 320b connect to the space inside the heat exchange container 370. The heating medium is supplied to the inside of the heat exchange container 370 through the feed pipe 320a. Moreover, the heating medium is discharged from the inside of the heat exchange container 370 through the exhaust pipe 320b. The heating medium is, for example, a liquid such as water or ethylene glycol or a gas such as air.

The extended section 350b extends laterally from the main body section 350a in such a way as to penetrate the wall of the heat exchange container 370 and extends upward on the outside of the heat exchange container 370. The surface S of the latent heat storage material 11 is formed in an upwardly-extending internal space formed by the extended section 350b. Moreover, the extended section 350b has a space 335 formed above the surface S of the latent heat storage material 11, the space 335 making contact with the surface S of the latent heat storage material 11. The space 335 is filled with a gas such as air. The extended section 350b is formed in such a way that most of the space 335 overlaps the heat exchange container 370 when the extended section 350b and the heat exchange container 370 are viewed in a plan view.

The heater 340 is, for example, a plate-like heater formed of a tube through which the heating medium is made to flow and a radiating member. The heater 340 may be a plate-like electric heater. The heater 340 is configured such that the temperature of heating by the heater 340 is changeable. The heater 340 is disposed above the extended section 350b so as to cover the space 335. The space cooler 360 is, for example, a plate-like thermoelectric element. The space cooler 360 is disposed so as to be in contact with the bottom wall of the extended section 350b forming the space 335. Moreover, the space cooler 360 is disposed in such a way that a face of the space cooler 360, the face opposite to the space 335, makes contact with the top face of the heat exchange container 370. As a result, the heat of the space 335 is transferred to the heat exchange container 370 via the space cooler 360.

The temperature sensor 390 is attached to the inner surface of the heat storage container 350 and is a sensor for detecting the temperature of the latent heat storage material 11.

The operation of the heat storage device 300a will be described. First, a heat storage operation by which heat is stored in the heat storage device 300a will be described. When the heat storage operation is started, the latent heat storage material 11 is in a solid-phase state. To store heat in the latent heat storage material 11, a heating medium having a temperature which is higher than or equal to the melting point of the latent heat storage material 11 is supplied to the inside of the heat exchange container 370 through the feed pipe 320a. The temperature of the latent heat storage material 11 in the solid-phase state rises due to heat exchange performed between the heating medium supplied to the inside of the heat exchange container 370 and the latent heat storage material 11. As a result, heat is stored in the latent heat storage material 11 in the form of sensible heat. Furthermore, when the temperature of the latent heat storage material 11 reaches the melting point of the latent heat storage material 11, the state of the latent heat storage material 11 changes from the solid-phase state to a liquid-phase state. As a result, heat is stored in the latent heat storage material 11 in the form of latent heat. When all the latent heat storage material 11 changes to the liquid-phase state, the temperature of the latent heat storage material 11 further rises. It is desirable that the heating medium is supplied for a sufficient time to turn all the latent heat storage material 11 into the liquid-phase state after the temperature of the latent heat storage material 11 reaches the melting point of the latent heat storage material 11. The supply or the supply time of the heating medium for storing heat in the latent heat storage material 11 is appropriately determined in accordance with the type of the latent heat storage material 11, the volumetric capacity of the latent heat storage material 11, the type of the heating medium, and so forth. As a result of the supply of the heating medium to the heat exchange container 370 being stopped, the heat storage operation is stopped. In this way, heat is stored in the heat storage device 300a. Depending on the type of the latent heat storage material 11 and the ambient temperature, it is possible to retain heat in the heat storage device 300a for a long period of time.

If a seed of a crystal is left in a portion of the latent heat storage material 11, the portion near the space 335, when heat is stored in the latent heat storage material 11, the latent heat storage material 11 cannot be brought into a supercooled state. Therefore, it is desirable to heat the space 335 by activating the heater 340 when heat is stored in the latent heat storage material 11. This makes it possible to prevent a seed of a crystal from being left in a portion of the latent heat storage material 11, the portion near the space 335. After the supply of heat is stopped, the sensible heat is released to the cold outside air as time passes, and the temperature of the latent heat storage material 11 becomes lower than the freezing point. However, since the latent heat storage material 11 can be supercooled, a phase change does not occur even when the temperature becomes lower than the freezing point. As a result of the latent heat storage material 11 maintaining the supercooled state, the latent heat is retained.

Next, an operation by which the heat stored in the latent heat storage material 11 is extracted when the latent heat storage material 11 is in a supercooled state will be described. First, the space 335 is heated by the heater 340 and the solvent is evaporated from the surface S of the latent heat storage material 11, whereby an anhydride of the dissolved substance is separated out on the surface S of the latent heat storage material 11. After it is determined that the anhydride of the dissolved substance has been separated out on the surface S of the latent heat storage material 11, the operation of the heater 340 is stopped and the space 335 is cooled by the space cooler 360. As a result, the moisture contained in the space 335 is condensed and a droplet is formed. This droplet is supplied to the surface S of the latent heat storage material 11. As a result, the anhydride of the dissolved substance dissolves, and a crystal nucleus of a hydrate of the dissolved substance is formed. By using this crystal nucleus as a starting point, a crystal grows all over the latent heat storage material 11, and the heat stored in the latent heat storage material 11 in the form of latent heat is released.

When the crystal growth occurs in the latent heat storage material 11, the temperature of the latent heat storage material 11 rises rapidly. By detecting a rapid change in the temperature of the latent heat storage material 11 with the temperature sensor 390, a determination of the presence or absence of the formation of a crystal nucleus in the latent heat storage material 11 is made. If it is determined that a crystal nucleus has been formed by the detection performed by the temperature sensor 390, the operation of the space cooler 360 is stopped. Moreover, the heating medium having a temperature which is lower than the melting point of the latent heat storage material 11 begins to be supplied to the inside of the heat exchange container 370 through the feed pipe 320a. The temperature of the heating medium supplied to the inside of the heat exchange container 370 rises as a result of the heating medium receiving the heat released from the latent heat storage material 11, and the heating medium is discharged out of the heat storage device 300a through the exhaust pipe 320b. The heat of the discharged heating medium is used in various devices.

<<Heat Utilization System>>

Figure 11:
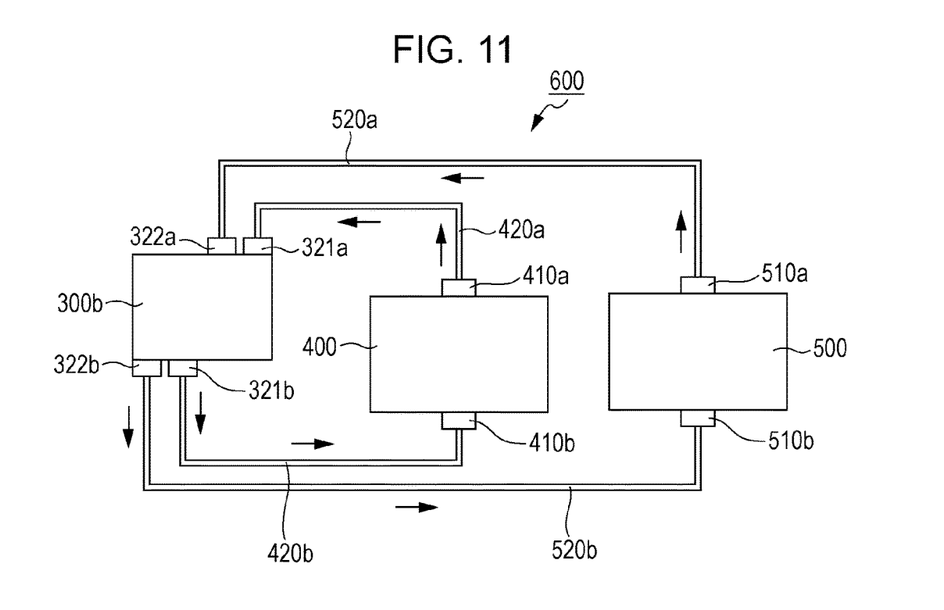
FIG. 11 is a configuration diagram of a heat utilization system.

Next, an example of a heat utilization system using the heat storage device described above will be described. As depicted in FIG. 11, a heat utilization system 600 includes a heat storage device 300b, a heat source device 400, and a heat utilization device 500. The heat storage device 300b is configured in a manner similar to the heat storage device 300a described above except that the heat storage device 300b is provided with a first feed pipe 321a, a second feed pipe 322a, a first exhaust pipe 321b, and a second exhaust pipe 322b in place of the feed pipe 320a and the exhaust pipe 320b. Each of flow channels formed by the first feed pipe 321a, the second feed pipe 322a, the first exhaust pipe 321b, and the second exhaust pipe 322b connects to an internal space of the heat exchange container 370.

The heat source device 400 is a device for providing a heating medium functioning as a heat source when heat is stored in the heat storage device 300b. The heat source device 400 includes an exhaust pipe 410a and a return pipe 410b. The exhaust pipe 410a and the first feed pipe 321a are connected to each other by piping 420a, and the first exhaust pipe 321b and the return pipe 410b are connected to each other by piping 420b. The heating medium inside the heat source device 400 is supplied to the heat storage device 300b through the exhaust pipe 410a, the piping 420a, and the first feed pipe 321a. The heating medium supplied to the heat storage device 300b from the heat source device 400 provides the heat thereof to the latent heat storage material 11 of the heat storage device 300b and is then returned to the heat source device 400 through the first exhaust pipe 321b, the piping 420b, and the return pipe 410b.

The heat utilization device 500 is a device in which the heat stored in the heat storage device 300b is used. The heat utilization device 500 includes an exhaust pipe 510a and a return pipe 510b. The exhaust pipe 510a and the second feed pipe 322a are connected to each other by piping 520a, and the second exhaust pipe 322b and the return pipe 510b are connected to each other by piping 520b. A heating medium inside the heat utilization device 500 is supplied to the heat storage device 300b through the exhaust pipe 510a, the piping 520a, and the second feed pipe 322a. The heating medium supplied to the heat storage device 300b from the heat utilization device 500 receives the heat released from the latent heat storage material 11 and is returned to the heat utilization device 500 through the second exhaust pipe 322b, the piping 520b, and the return pipe 510b.

In the heat utilization system 600, for example, as the heating medium supplied from the heat source device 400, hot water remaining in a bathtub may be used, and, as the heating medium supplied from the heat utilization device 500, water to be supplied to a washing machine or a washing machine with a drying function may be used. In this case, it is possible to heat the water to be supplied to the washing machine or the washing machine with a drying function by the heat stored in the latent heat storage material 11, the heat which is released with the formation of a crystal nucleus in the latent heat storage material 11, while storing the heat of the hot water remaining in the bathtub in the heat storage device 300b. Moreover, in the heat utilization system 600, as the heating medium supplied from the heat utilization device 500, air which is to be warm air for drying clothes in the washing machine with a drying function may be used.

As the heating medium supplied from the heat source device 400, a drainage from a dishwashing machine with a drying function or a dish drying machine may be used, and, as the heating medium supplied from the heat utilization device 500, water or air to be supplied to the dishwashing machine with a drying function or the dish drying machine may be used. This makes it possible to store the heat of the drainage from the dishwashing machine with a drying function or the dish drying machine in the heat storage device 300b and use the heat to heat the water for cleaning or the air for drying in the dishwashing machine with a drying function or the dish drying machine.

As the heating medium supplied from the heat source device 400, a fluid which has received the exhaust heat from a compressor of a refrigerator may be used, and, as the heating medium supplied from the heat utilization device 500, a fluid for defrosting the refrigerator may be used. This makes it possible to store the exhaust heat from the compressor of the refrigerator in the heat storage device 300b and use the exhaust heat to defrost the refrigerator.

As the heating medium supplied from the heat source device 400, a fluid which has received the exhaust heat of a vehicle engine may be used, and, as the heating medium supplied from the heat utilization device 500, air for performing heating for a vehicle may be used. This makes it possible to store the exhaust heat of the vehicle engine in the heat storage device 300b and use the exhaust heat for performing heating for a vehicle.

In the present disclosure, the anhydride separation units 20 and 40 and heaters 20a, 41 and 340 and cooler 43 and droplet feeding units 30 and 60 and space coolers 60a and 360 and dropping device 62 may be controlled by a controller to perform steps S1 and S2. The operations in the heat storage device 300a and heat utilization system 600 may also be controlled by the controller. The controller may be implemented as one or more of electronic circuits including, but not limited to, a semiconductor device, a semiconductor integrated circuit (IC) or an LSI. The LSI or IC can be integrated into one chip, or also can be a combination of plural chips. For example, functional blocks other than a memory may be integrated into one chip. The name used here is LSI or IC, but it may also be called system LSI, VLSI (very large scale integration), or ULSI (ultra large scale integration) depending on the degree of integration. A Field Programmable Gate Array (FPGA) that can be programmed after manufacturing an LSI or a reconfigurable logic device that allows reconfiguration of the connection or setup of circuit cells inside the LSI can be used for the same purpose.

Further, it is also possible that all or a part of the functions or operations of steps S1 and S2 are implemented by executing software. In such a case, the software is recorded on one or more non-transitory recording media such as a ROM, an optical disk or a hard disk drive, and when the software is executed by a processor, the software causes the processor together with peripheral devices to execute the functions specified in the software. A system or apparatus may include such one or more non-transitory recording media on which the software is recorded and a processor together with necessary hardware devices such as an interface.

With the heat storage device of the present disclosure, it is possible to extract heat from the latent heat storage material in a supercooled state at appropriate time in accordance with demand. As a result, by incorporating the heat storage device of the present disclosure into, for example, a washing machine, a washing machine with a drying function, a heating appliance, a dishwashing machine with a drying function, a dish drying machine, a refrigerator, a heating apparatus for a vehicle, and so forth, it is possible to make efficient use of the heat stored in the latent heat storage material to warm water or air. Moreover, it is possible to reduce the energy consumption without impairing the original functions and performance of these devices. Furthermore, the heat storage device of the present disclosure can be used in various other devices which are required to use heat effectively.

What is claimed is:

1. A method for forming a crystal nucleus in a latent heat storage material containing a solvent and a dissolved substance, the solvent containing water as a main ingredient, the method comprising:
    (a) separating out an anhydride of the dissolved substance by heating or cooling part of the latent heat storage material in a supercooled state in which the latent heat storage material is maintained in a liquid state below a freezing point of the latent heat storage material while not becoming a solid, the latent heat storage material retaining latent heat in the supercooled state; and
    (b) supplying a droplet comprising water to the anhydride or a surface of the latent heat storage material on which the anhydride has been separated out, to terminate the supercooled state of the latent heat storage material, and make the latent heat storage material dissipate heat.

2. The method for forming a crystal nucleus according to claim 1, wherein
    the latent heat storage material is contained in a container in such a way that a space in contact with the surface of the latent heat storage material is formed in the container,
    in the step (a), the part of the latent heat storage material in the supercooled state is heated by heating the space or the surface, to evaporate part of the solvent from the surface, and separate out the anhydride of the dissolved substance on the surface, and
    the step (b) further includes forming the droplet by condensing moisture contained in the space.

3. The method for forming a crystal nucleus according to claim 1, wherein the dissolved substance is a salt and in the step (b), a crystal nucleus of a hydrate of the dissolved substance is formed.

4. A heat storage device comprising:
    a latent heat storage material containing a solvent and a dissolved substance, the solvent containing water as a main ingredient, the latent heat storage material that retains latent heat when the latent heat storage material is in a supercooled state;
    a container containing the latent heat storage material in the supercooled state in which the latent heat storage material is maintained in a liquid state below a freezing point of the latent heat storage material while not becoming a solid;
    a heater adapted to heat part of the latent heat storage material in the supercooled state to separate out an anhydride of the dissolved substance; and
    a droplet feeder adapted to supply a droplet comprising water to the anhydride or a surface of the latent heat storage material on which the anhydride is located, to terminate the supercooled state of the latent heat storage material, and make the latent heat storage material dissipate heat, wherein
    the container has a space in contact with the surface of the latent heat storage material therein,
    the heater is adapted to heat the part of the latent heat storage material in the supercooled state by heating the space or the surface, to evaporate part of the solvent from the surface, and separate out the anhydride of the dissolved substance, and
    the droplet feeder includes a space cooler that cools the space to form the droplet by condensing moisture contained in the space.

5. The heat storage device according to claim 4, wherein the dissolved substance is a salt.

6. The heat storage device according to claim 4, wherein the dissolved substance is a salt.

* * * * *